United States Patent [19]

Gobeli et al.

[11] Patent Number: 5,198,920
[45] Date of Patent: Mar. 30, 1993

[54] TRANSVERSE PIXEL FORMAT ELECTRO-OPTIC SPATIAL LIGHT MODULATOR

[75] Inventors: Garth W. Gobeli, Casselberry; Thomas M. Toor, Orlando, both of Fla.

[73] Assignee: Plztech, Inc., Albuquerque, N. Mex.

[21] Appl. No.: 786,818

[22] Filed: Nov. 5, 1991

[51] Int. Cl.⁵ .............................. G02F 1/03; G02F 1/29
[52] U.S. Cl. ..................................... 359/245; 359/315; 359/320; 359/322
[58] Field of Search .............. 359/245, 250, 254, 315, 359/320, 323, 322, 277

[56] References Cited

U.S. PATENT DOCUMENTS 3,609,002  9/1971  Fraser et al. ...................... 359/254
4,158,201  6/1979  Smith et al. ....................... 359/323

FOREIGN PATENT DOCUMENTS 2008786  6/1979  United Kingdom ............... 359/254

Primary Examiner—Bruce Y. Arnold
Assistant Examiner—Evelyn A. Lester
Attorney, Agent, or Firm—Cahill, Sutton & Thomas

[57] ABSTRACT

A spatial light modulator comprising a solid state light valve comprising a high density two-dimensional array of "Kerr-cell" like pixels formed in a solid state electro-optical composition such as lanthanum modified lead zirconium titanate (PLZT). Transverse electrodes are deposited on a layer of PLZT the composition of which may provide for memory mode or non-memory mode operation. Pixels are defined in the electro-optic materials in regions between adjacent electrodes deposited on the electro-optic material. The array may be addressed optically or electronically to generate an electric field in the electro-optic material, and thus activate pixels.

4 Claims, 3 Drawing Sheets

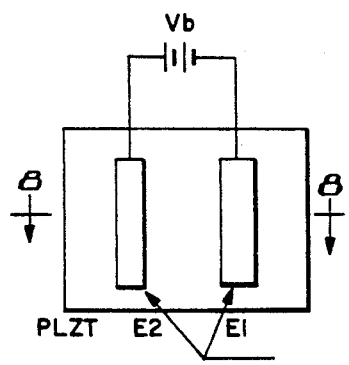
FIG_7
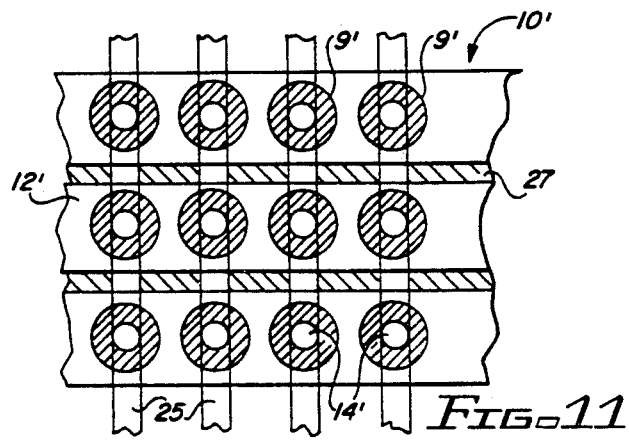
FIG_11
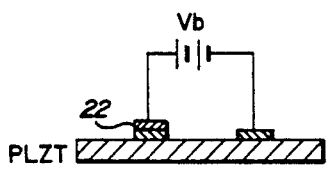
FIG_8
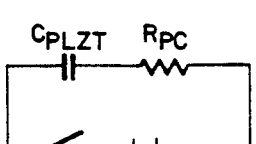
FIG_12
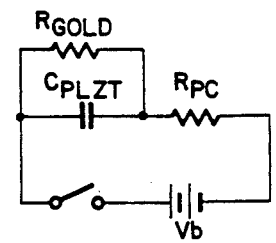
FIG_13
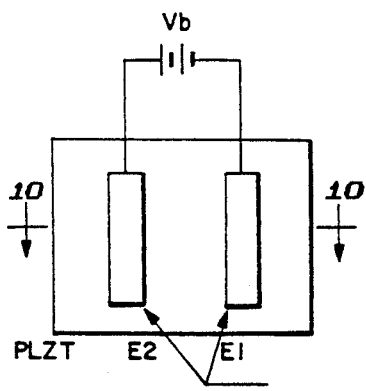
FIG_9
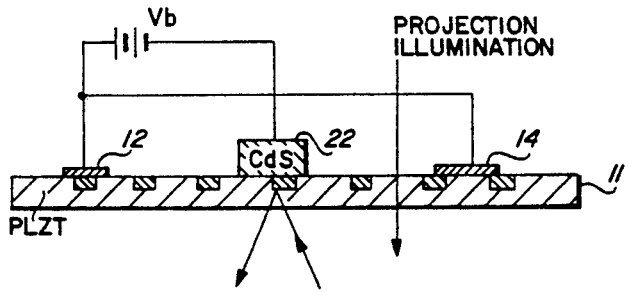
FIG_14
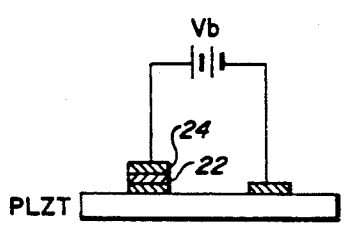
FIG_10

TRANSVERSE PIXEL FORMAT ELECTRO-OPTIC SPATIAL LIGHT MODULATOR

BACKGROUND OF THE INVENTION

The present invention relates to a spatial light modulator, and more specifically, to a spatial light modulator comprising a solid state light valve formed of a ferroelectric material such as lanthanum modified lead zirconium titanate (PLZT) composition.

A light modulator is a device that modifies some property of a beam of light. A light modulator which operates on the various spatial cross-sectional regions of a light beam is a two dimensional light modulator and is referred to as a "spatial light modulator".

PLZT is a very well known and characterized material. See, for example, an article by Gene H. Haertling, *Electronic Ceramics,* Chapter 7, (1988). Applications in the present invention employ PLZT of a chemical composition involving a ratio of lanthanum, lead and zirconium which yield a ferroelectric behavior (the rhombohedral or tetragonal structure) and is designated as "memory mode" material. Also, compositions which yield a paraelectric or an antiferroelectric behavior (the cubic or symmetrical structure) are employed and such compositions are designated as "non-memory mode" material. An example of memory mode material could be that designated as 7.5/65/35 (lanthanum/lead/zirconium) and a non-memory mode material could be designated as 9.5/65/35.

Spatial light modulators are well known and extensively studied devices. They are broadly categorized according to the method of impressing upon them the information to be displayed, modulated, etc. The two methods of providing such information to the device are known as "optical" or "electronic" addressing, respectively. Optical addressing is discussed in detail by Jenkins and Tanguay, *Neural Networks for Signal Processing,* Chapter 9, (1991). Electronic addressing is discussed in detail by Lee and Sheu, Ibid, Chapter 8.

Most spatial light modulators, particularly the optically addressed variety, have a "sandwich" structure in which a photoconductor is sandwiched together with a light modulator material, such as a liquid crystal. The information to be modulated or projected is presented to the spatial light modulator (hereinafter referred to as "SLM") as an optical image and the light valve responds to this image via a photoconductive action which changes the local electric field at the light valve to provide a variance in transmission or reflection. Frequently there is no requirement for a matrix type of electrode structure at all. Electrically addressed spatial light modulators usually require a transverse electrode structure for their operation. The information for such an addressing scheme is provided as a set of electrical signals and are subsequently converted into an image by the modulator structure. This transverse structure is sometimes used to activate a longitudinal or through-the-thickness applied electric field effect in the modulator material.

Some specialized modulators, such as a deformable mirror device, employ a two-dimensional very large scale integration (VLSI) fabricated activation structure formed in/on silicon with a deformable membrane overlying the activation regions.

The initial motivation for the development of light control devices was the projection and flat screen devices for television and computer displays. The next major impetus for the SLM development followed from the discovery of holography and the recognition of the Fourier transforming properties of optical propagation and simple lenses. Accordingly, the number of applications for SLM devices has grown rapidly into such areas as optical signal processing, data processing and computing.

However, there is room for improvement of SLM devices, particularly in the areas of speed of operation, pixel-to-pixel contrast ratio, and illumination uniformity over the display format.

SUMMARY OF THE INVENTION

It is a primary object of the present invention to provide a spatial light modulator device which has enhanced speed of operation, improved contrast ratio, minimal pixel-to-pixel bleed-through (i.e., cross talk) and high brightness capabilities.

It is another primary object of this invention to provide a spatial light modulator comprising a light valve formed of a solid state electro-optic material.

It is still another object of this invention to provide a spatial light modulator comprising a light valve having a novel two-dimensional pixelated array structure, which array structure operates by utilizing the transverse electro-optic effect.

It is yet another object of the present invention to provide a solid state electro-optic light valve capable of being scaled up to larger sizes without inordinate increases in cost.

Briefly, the present invention is directed to a spatial light modulator comprising a solid state light valve having a high density two-dimensional array of "Kerr-cell" like pixels formed on the surface of an electro-optic material. Preferably, the electro-optic material is lanthanum modified lead zirconium titanate (PLZT). Transverse electrodes are deposited on a layer of PLZT of a composition providing for memory mode or non-memory mode operation.

The two-dimensional array may take on a variety of structures. In one embodiment, one electrode is a set of metallic comb structures and the other electrode is a set of island like structures formed in the spaces between the teeth of the combs. The island electrodes are comprised of or covered by photoconductive material, and the contacts thereto are isolated from the comb electrodes by a deposited insulating film. An applied voltage activates the individual Kerr-cells when activation light impinges on a corresponding photoconductor island electrode. In another embodiment, the first set of electrodes comprise parallel rows of conductive strips and the center of insulative rings disposed on the strips correspond to island electrodes.

In the present invention, the optically and electronically addressed versions of the light valve are geometrically identical with the only difference being the composition of the PLZT employed in the light valve itself (and of course the addressing itself). For an optically addressed unit, the island electrode incorporates a suitable photoconductor, such as CdS or amorphous silicon, either as the electrode itself or as a coating over some intervening electrode material. In the electronically addressed unit, the island electrode is a suitable electrically conductive coating, which island electrodes are connected in linear arrays transverse to the comb electrodes by a strip of metallic aluminum or by a layer of indium-tin-oxide (ITO).

The PLZT light valve may be employed in several devices such as helmet mounted visual image displays, high intensity/brightness projectors and direct viewing displays.

The above and other objects and advantages will become more readily apparent when reference is made to the following description taken in conjunction with the accompanying drawings.

BRIEF DESCRIPTION OF THE DRAWINGS

FIG. 7 illustrates in detail an electrode structure employing an optical switching mechanism.

FIG. 8 is a cross section taken through line 8—8 of FIG. 7.

FIG. 9 illustrates in detail an electrode structure employing a modified optical switching mechanism.

FIG. 10 is a cross section taken through line 10—10 of FIG. 9.

FIG. 11 is an enlarged view showing another type of two-dimensional pixelated light valve array.

FIG. 12 is a schematic diagram of an image converter comprising the solid state electro-optic light valve according to the present invention.

FIG. 13 is an electrical circuit representation of a single pixel of the solid state electro-optic light valve according to the present invention.

FIG. 14 is an electrical circuit representation of a modified single pixel of the solid state electro-optic light valve having a layer of gold deposited over the solid state electro-optic layer.

DETAILED DESCRIPTION OF THE DRAWINGS

Referring to FIGS. 1A–1C, 2 and 3, a two-dimensional light valve according to the present invention is shown generally at 10. The light valve 10 comprises a high density array of "Kerr-cell"-like pixels formed in a layer of electro-optic material such as $LiNbO_3$, $BaTiO_3$, or an electro-optic ceramic material known as lanthanum modified lead zirconium titanate, or PLZT.

Figure 1B:
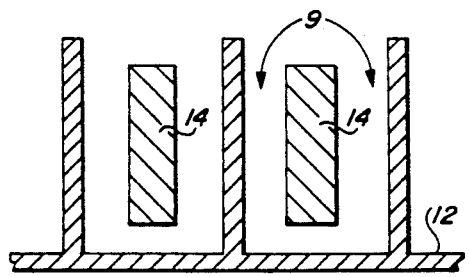
FIG. 1B is an enlarged view showing the comb-island electrode structure of the pixelated array structure shown in FIG. 1A.

As shown in the enlarged view of FIG. 1B, one electrode 12 is a set of metallic comb structures and the other electrode 14 is a set of islands disposed in the spaces between the teeth of the combs. As will be described hereinafter, the island electrodes 14 may include photoconductors, such as (Cd:Zn)S, but nevertheless are isolated from the comb electrodes 12 by a deposited insulating film. The island electrodes 14 serve as the "activation elements". The clear or unoccupied areas 9 on both sides of the island electrodes 14, called the "canal" regions, are the spaces through which the switched or modulated light is transmitted when the islands are activated. One pixel is the aggregate of the two canal regions on opposite sides of a single island electrode.

Figure 2:
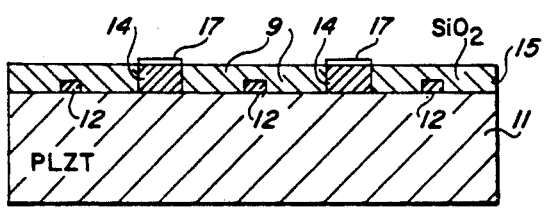
FIG. 2 is a cross section taken through line 2—2 of FIG. 1 for an electronically addressed device.

FIG. 2 illustrates a cross section of the light valve 10 and the connections to the electrodes 12 and 14 for an electronically addressed device. The metallic aluminum (Al) layers forming the electrodes 12 and 14 are deposited on a layer 11 of PLZT material.

In the electrically addressed device shown in FIG. 2, the islands comprise a set of electrically conducting electrodes, such as metallic aluminum or deposited indium-tin-oxide (ITO). In the optically addressed device shown in FIG. 3, the island electrodes 14 only are comprised of a photoconductor, such as PbSe, CdS or a metallic electrode coated with such photoconductor, fabricated by means well known in the semiconductor processing industry.

Figure 1C:
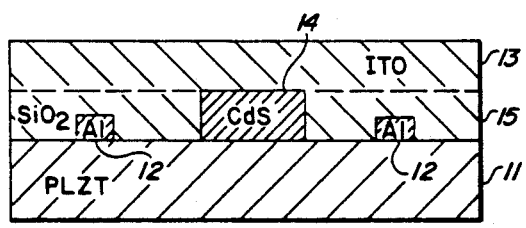
FIG. 1C is a cross section of the pixelated electrode array structure showing a modified connecting structure for the island electrodes.

An electrically insulating and optically transparent film 15, such as silicon dioxide ($SiO_2$), is deposited (e.g., by sputtering or other means) onto the entire structure except for where the island electrodes 14 remain exposed, i.e. the islands are a "buried" electrode assembly. Specifically, as shown in FIG. 1C, a continuous layer 13 of an electrically conductive and optically transparent material, such as indium-tin-oxide (ITO), is 10 then deposited over the entire surface for connecting the islands together for the optically addressed version of the device.

Alternatively, as shown in FIGS. IA, 2 and 3, strip metallic electrodes 17 can be deposited over the device in the "x" direction such that the "canals" remain uncovered by such strips. This set of strip electrodes will make contact with the island electrodes 14 but not with the comb electrodes 12. This device configuration then requires that the activation light for an optically addressed device be incident on the islands from the PLZT side of the light valve.

This latter configuration is the preferred one for an electronically addressed device and requires that each strip electrode by contacted individually as are the individual comb electrodes which make up the "y" set of addressing electrodes.

Finally, for the optically addressed device the island electrodes can be coated with a registered set of islands of a deposited light filtering material such as Ge when wavelength discrimination would be beneficial to the application being contemplated for the device.

Electro-optic ceramic materials may behave in several distinct manners: (1) quadratic electro-optic elements having a quadratic relationship between $(n1-n2)$ and E (Kerr-cells); (2) linear electro-optic elements possessing a linear relationship between $(n1-n2)$ and E (Pockels effect); and (3) linear memory materials with switchable remnant electro-optic states.

The materials may be characterized by their electro-optic coefficients, R and rc:

$R = -2(n1-n2)/n^3E^2$ $rc = -2(n1-n2)/n^3E,$ where (n1−n2) is the birefringence, n is the index of refraction, and E is the electric field. For a typical non-memory birefringent PLZT material, $R = 3.8 \times 10^{-16} (m^2/v^2)$ and for a typical memory transverse birefringent material, $rc = 1.2 \times 10^{-10}$ (m/v).

In earlier implementations involving the transverse birefringence effect in PLZT, for example in the "flash blindness" goggles used by the United States Air Force, the PLZT plate thickness is of the order of the electrode spacing in order to achieve uniform electro-optical switching in the PLZT. The device according to the present invention, which may be used for visual display purposes, does not require such switching uniformity in order to function properly. Thus, the formulation of electrodes having inter-electrode spacings of 10 microns or less does not denigrate the utility of the device but, rather, could even be a value added effect in that it could lend itself to providing a more manageable gray scale vs. applied voltage (or activation light intensity) relationship.

Also, with both substrate thickness and inter-electrode spacings of the order of 0.5 mm, the operational voltage of the flash blindness goggles is about 350 volts. Such switching voltages require discrete electronic components for implementation because current silicon technology, the most widely used technology, is limited to switching voltages of less than about 70 volts. The 10 micron inter-electrode spacings employed in this invention require less than 30 volts for switching even for devices made of bulk material and thus this device lends itself much more readily to integration into large scale integration (LSI) or even VLSI silicon based fabrication techniques. Preferably, the distance between the center of adjacent island electrodes is 25 microns, but may be in the range of 5 to 250 microns.

On the other hand, optical computing devices would place very stringent requirements on the switching uniformity. Thus, for applications in optical computing, the PLZT substrates which carry the "pixelated" electrode structure of this disclosure should be some 20 microns or less in thickness in order to provide such high quality switching uniformity. (The thinnest plate that can be readily fabricated from bulk PLZT is about 200 microns.)

Such thin film PLZT samples could be produced by several currently utilized methods.

Sputter deposition of thin film PLZT samples onto a variety of substrates, such as sapphire, has been reported in many publications. Such films are of modest quality, by bulk sample standards, and the deposition of films of 20 microns thickness might require an inordinately long time to achieve (of the order of days). Nonetheless, such films could be useful in the optical computation applications of this device.

Sol-Gel deposition of thin PLZT samples (of thicknesses of 0.1 microns) has also been reported. By a laborious application of such techniques, 10–20 microns thick PLZT films could be fabricated which would be of quite high optical and electronic properties.

Plasma enhanced chemical vapor deposition (PECVD) of PLZT films is currently under investigation at some research and development facilities and this approach seems to offer promise for rapid (30 microns/hr) deposition of high quality films. Such films would be excellent candidates for implementation of optical computation applications for the PLZT based SLM.

Figure 3:
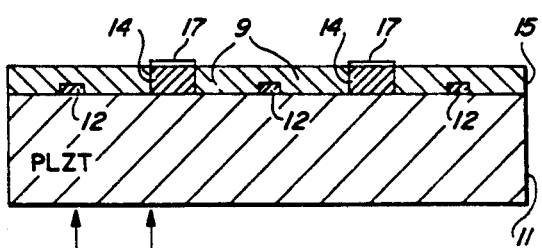
FIG. 3 is a cross section taken through line 3—3 of FIG. 1 for an optically address device.

With reference to FIG. 3, the optically addressed light valve 10 operates generally as follows. Light falling on the entire structure excites the island photoconductor (PC) according to the intensity of the activation light at each pixel. The excited PC causes voltage to be applied between the corresponding island and comb electrodes, which induces birefringence in the PLZT layer between the electrodes 12 and 14. The induced birefringence is proportional to the activation light intensity on each pixel. This in turn permits the transmission of incident light through those areas, which can be viewed by the eye or other means. An image converter device, e.g. infrared to visible, can be fabricated if the PC is PbSe or some other IR sensitive material, and the projection light is in the visible wavelength range.

There are several types of electro-optic behaviors of PLZT. The ones utilized according to the present invention are: (1) transverse, quadratic birefringence, and/or (2) transverse, linear or memory birefringence.

Figure 1A:
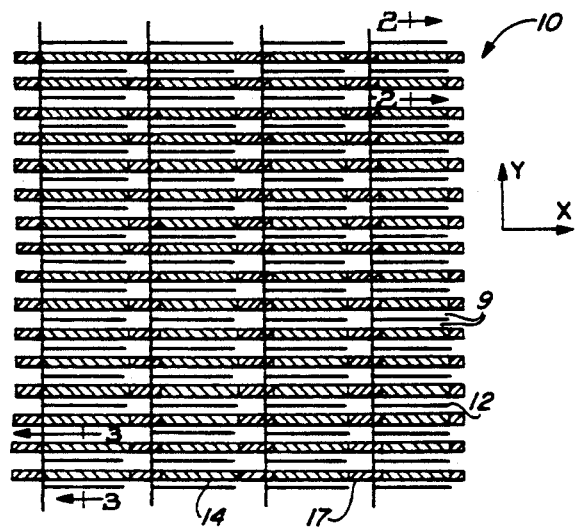
FIG. 1A is a top view of a two-dimensional pixelated light valve array in accordance with the present invention.
Figure 4:
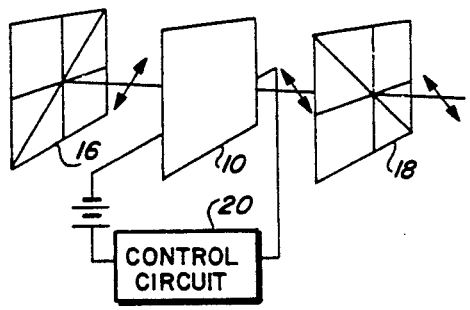
FIG. 4 is a schematic representation of a single Kerr-cell comprising a light valve according to the present invention.

Referring now to FIG. 4, a Kerr-cell arrangement is shown for purposes of describing the basic operation of the light valve 10. The light valve 10 is placed between two crossed polarizers 16 and 18, each oriented at 45 degrees relative to the applied transverse electric field. A control circuit 20 controls the voltage applied to the light valve 10. The birefringence and hence the light transmitted through the polarizer 18 increases with increased applied voltage to the light valve 10. In this configuration of the device, non-memory mode PLZT is employed. The electric field is applied transversely to the optical axis of the system via the electrodes 12 and 14 deposited on the PLZT layer 11. The effective birefringence increases as the square of the internal electric field. When voltage is applied to the light valve 10, creating an "on" state condition, transmittances of the order of 35% are achieved. When no voltage is applied, transmittances of 0.07% to 0.05% can be achieved.

Figure 5:
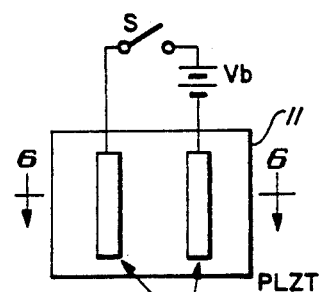
FIG. 5 illustrates in detail the electrode structure of the light valve shown in FIG. 1 employing an electrical switching mechanism.
Figure 6:
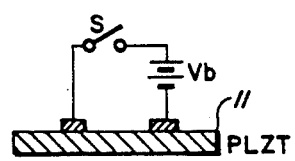
FIG. 6 is a cross section taken through line 6—6 of FIG. 5.

FIGS. 5 and 6 illustrate the operation of the light valve 10 according to an electrically addressed light valve mechanism. The two electrodes E1 and E2 are deposited on the surface of the PLZT material 11 and a voltage Vb is applied to them via switch S. Electrode E1 corresponds to a segment of the comb electrodes 12 and electrode E2 corresponds to one of the island electrodes 14. When the switch S is open, the voltage across the electrodes is zero and the device is in the "off" condition. Transmission of light through the PLZT layer 11 between electrodes E1 and E2 is at a minimum. When the switch S is closed, the voltage across the electrodes is Vb and with the appropriate level of Vb, the transmission can be maximized. In the array shown in FIGS. 1A and 1B, when a pixel is made active, the voltage Vb is supplied so that the island electrode is at one polarity and the comb electrodes on both sides are at the other polarity. This induces birefringence in the two canal regions between the island and adjacent comb electrodes, allowing light to pass through these canal regions.

The PLZT based spatial light modulator which has metallic island electrodes has characteristics which are based on this simple electrical contacting system. The main design challenges associated with such a device are twofold: (1) how to make contact to a very large number of pixel cells, eventually as many as four million; and (2) how to provide the function of the mechanical switch.

There are many ways to effect array addressing of large number of pixels, some of which are:

Direct: One lead to each pixel

Scan: Each pixel is defined by beam size focused on continuous screen of pixel media Grid: Each pixel defined by position in matrix Shift: Each pixel is connected between one row channel and a pair of column leads Matrix: Each pixel electronically connected between one row lead and one column lead The method that is most practical for the light valve according to the present invention when used as a flat display panel, is the matrix addressing scheme. In this approach, the pixels are connected via a set of row and column electrodes. An individual pixel can be selected by the straight forward method of choosing a particular row and a particular column which uniquely selects that pixel. Thus, an array of 2,000 rows by 2,000 columns, which designates an array of four million pixels can be uniquely addressed from only 2,000+2,000=4,000 leads.

Problems associated with matrix addressing are related to the classical "one-third select" effect cause by a "sneak" circuit created in the matrix. Basically, for any single addressed pixel with a potential V applied, all remaining pixels in the array will have at least one-third V applied across them.

Thus for matrix addressing to be practical, a nonlinear element must be present in the array to compensate for this effect. The nonlinearity can be supplied by an element extrinsic to the array itself, such as a thin film transistor (TFT) which is added to each pixel in conventional liquid crystal display (LCD) arrays. Alternatively, it may be provided as an intrinsic part of the array itself by virtue of the hysteresis effect exhibited by the memory mode PLZT which is employed in the light valve of the present invention. In fact, this approach provides a very appealing feature for the present invention. Indeed, ferroelectric materials such as PLZT have been used in conjunction with liquid crystal display devices to provide the necessary nonlinearity.

FIGS. 7 and 8 illustrate an optically addressed device wherein the mechanical switch S is replaced by a photoconductor switch 22. Specifically, a layer of photoconductor material is placed over the electrode E2. When there is no light incident on the photoconductor capable of exciting conductivity, then the photoconductor switch 22 is in its high resistance state and the voltage across the inter-electrode gap is practically zero. Thus, the device is in the "off" state.

When the photoconductor switch 22 is illuminated by activating illumination, its resistance drops to a low value so that the applied voltage Vb appears across the electrodes E1 and E2. Thus, the light transmitted through the space between the comb electrodes and the island electrodes, is controlled or modulated by a different light source, called an activating light source, as opposed to the image light source which is passed through the light valve.

FIGS. 9 and 10 illustrate a modified optical addressing configuration whereby the device of FIGS. 7 and 8 is modified by adding a wavelength discrimination filter 24 to the upper surface of the photoconductor switch 22. For example, the photoconductor material may be PbSe (lead selenide) which is photoconductive for wavelengths less than 5 microns and has a peak response between 4.5 and 5 microns. The discrimination filter 24 may be germanium (Ge) which absorbs light for wavelengths shorter than 1.8 microns. Consequently, the only incident radiation capable of exciting the photoconductor switch 22 will lie in the wavelength range from 2 to 5 microns. This lies in the infrared band. On the other hand, visible radiation (0.38 to 0.78 microns) is passed through the PLZT layer between the electrodes depending on the voltage applied between them. The voltage is modified by the intensity of the infrared radiation falling on the electrode E2, which excites the PbSe. This device converts an infrared light excitation into a visible light observable signal.

FIG. 11 illustrates another type of two-dimensional pixelated structure. In this version, the comb electrodes comprise row electrodes 12' with holes cut therethrough at spaced intervals and the island electrodes 14' are conductive pieces disposed at the center of the holes. The space in the hole around the island electrodes 14' are filled with insulative material and the island protrudes above the insulative material. The island electrodes 14' are connected by conductive strips 25 and the comb electrodes 12' are separated by insulative strips 27. The canal regions 9' are the pixels.

The electrical characteristics of the light valve device of the present invention can be described as follows. Each pixel behaves as a capacitor, as part of an equivalent circuit shown in FIG. 12. As the electric charge is deposited on the capacitor, the voltage across the electrodes increases and therefore the birefringence increases. Since the charge is collected over a period of time and is stored in the capacitor, the pixel cell acts effectively as a photon integrator. This requires that the capacitor be periodically discharged to zero charge. However, the photoconductor acts only as a simple switch or variable resistor. Therefore, a mechanism is needed to periodically remove the charge rapidly from the capacitor.

FIG. 13 illustrates an approach for discharging the effective capacitance of the PLZT layer 11. Specifically, a very thin conductive layer, such as gold, is flash deposited onto the entire PLZT layer prior to the deposition of the electrodes 12 and 14. The gold layer provides a discharge path for the PLZT pixel element capacitors whenever the pixel is "off". The thickness of the gold layer is chosen so that its resistance lies between that of the photoconductor's on and off resistances:

$$R_{pc/off} > R_{gold} > R_{pc/on}.$$

Gold films of thicknesses required by the appropriate resistance value (approximately 10 megohms, more or less) are almost totally transparent to optical radiation and thus do not significantly impact optical operation of the device. As a result, when the photoconductor is in the off condition, its resistance is large compared to the resistance of the gold layer. Then the applied voltage, Vb, is across the photoconductor and the transmission is minimized. Any residual transmission can be balanced out by using a quarter wavelength plate following the first polarizer and adjusting the analyzer to yield zero transmission in the "off" state. When the photoconductor is in the "on" condition, its resistance is low compared to the gold layer and the system transmission reaches its maximum value.

FIG. 14 illustrates a modified light modulator called a photoactivated digital light valve (PADLV). The PADLV has utility in optical computing devices as well as in high brightness optical projectors. In this modification, the photoconductor activating input image light is incident from below, as shown in the figure. Thus, activation light and projection light can be in the same wavelength range. The photoconductor 22 may be comprised of CdS, in which case the activation light should be concentrated near the yellow-green range of the visible spectrum, near 570 nm. The high brightness projection light which is incident from above is transmitted through the PLZT region that lies between the electrodes, and depends upon the brightness of the activation light incident on the local island control electrode E2. When the photoconductor is activated with illumination, its resistance drops, effectively placing the voltage Vb across the electrodes 12 and 14. When unactivated, the photoconductor is at a high resistance, preventing light from passing through the PLZT layer 11.

The projection light and the activation light may be of any wavelength for which the PLZT and the associated coatings are transparent. For example, PLZT is transparent for wavelengths from about 400 nm to 7.5 microns and in thin film configurations, such devices may be made to operate for wavelengths as long as 11–12 microns. With the projection light significantly different in wavelength from the activation light, many applications are possible.

The spatial light modulator according to the present invention has several performance advantages over devices heretofore known. One particular advantage is the switching time. The PLZT switching time has been measured to be less than one microsecond, which means that a frame rate of at least 1,000 per second can be achieved. Also, the relaxation times of CdS, and/or amorphous silicon photoconductors are less than 1 millisecond, again meaning that a 1000 Hz framing rate is clearly feasible. In addition, the light valve of the present invention may be scaled up to larger dimensions without facing new and costly design challenges.

The principles and features of the present invention are useful in many applications. The light valve according to the present invention has utility in many known devices, whereby the accuracy of modulation or display is greatly improved. In particular, the electro-optic light valve may replace the liquid crystal light valve, in any device using a light valve, with all other components of such devices being substantially the same.

Figure 15:
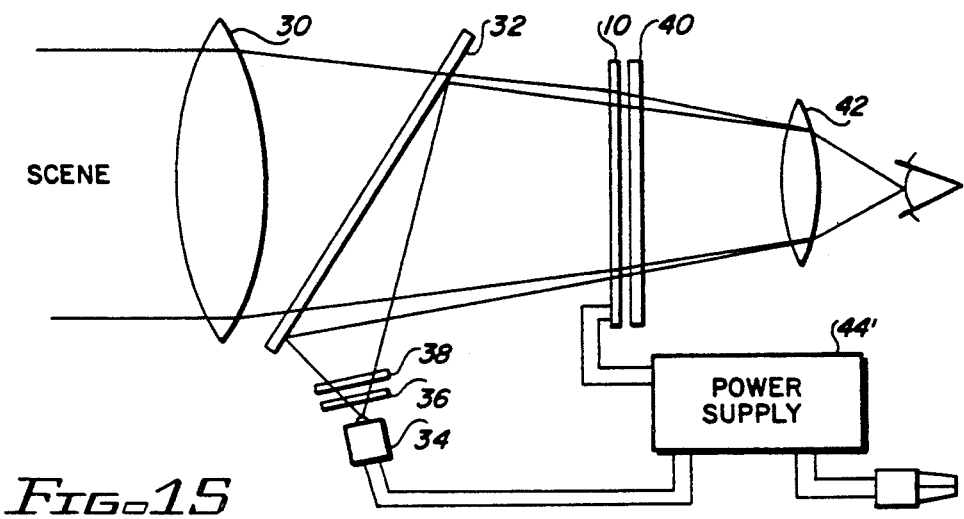
FIG. 15 illustrates a photoactivated digital light valve device employing a solid state electro-optic light valve in accordance with the present invention.

FIG. 15 illustrates an image converter device employing the light valve 10 according to the present invention. The image converter device is completely enclosed and includes a germanium (Ge) lens 30 serving as the input aperture which images a scene onto the light valve 10. The lens 30 also blocks all visible radiation from the scene and the image is formed by radiation of wavelengths greater than 2 microns. A dichroic beam splitter ("hot") mirror 32 is placed adjacent the germanium lens and passes infrared radiation while reflecting visible radiation. Therefore, the mirror 32 passes an infrared image of the scene on the light valve 10.

An incandescent lamp 34 is provided to illuminate the light valve 10 through a dichroic cold mirror 36 which passes only visible radiation and reflects infrared radiation, and through a polarizer 38, which is oriented at +45 degrees relative to the electrode segments on the light valve 10. An analyzer 40 (perpendicular complement of the polarizer 38) is positioned behind the light valve 10 and completes the optical Kerr-cell configuration. The visible image which is transmitted due to the "backlighting" effect of the lamp 34 is viewable directly by the eye as a visual image via a magnifying lens 42, or a CCD camera. The power supply 44 controls the state of the pixels on the light valve 10 according to control information.

Figure 16:
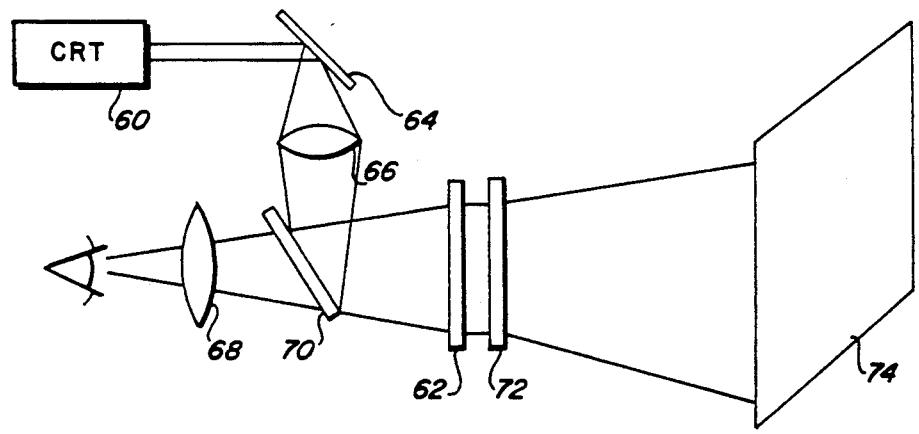
FIG. 16 is a schematic diagram of a helmet mounted visual image display device employing the solid state electro-optic light valve according to the present invention.

FIG. 16 illustrates a helmet mounted visual image display (HMVID) using the PADLV according to the present invention. A schematic representation of a HMVID is shown in FIG. 16. A small high resolution CRT 60 is provided to form the image to be amplified and projected by the PADLV 62. The image projected by the CRT 60 is focused onto the surface of the PADLV 62 by a camera lens 68, in turn via lens 66 and beam splitter 70. A backlighting panel 72 is positioned on the opposite side of the PADLV 62. If the image forming light is outside the normal visual range, then the beam splitter 70, which is a dichroic mirror, could be formulated so as to totally reflect the radiation, and hence isolate the eye from the radiation feedback, while totally transmitting the visible spectrum. Alteratively, the HMVID may be constructed using an electronically addressed light valve according to the present invention. In this case, no CRT is needed and the circuitry which drives the CRT will drive the light valve directly.

Figure 17:
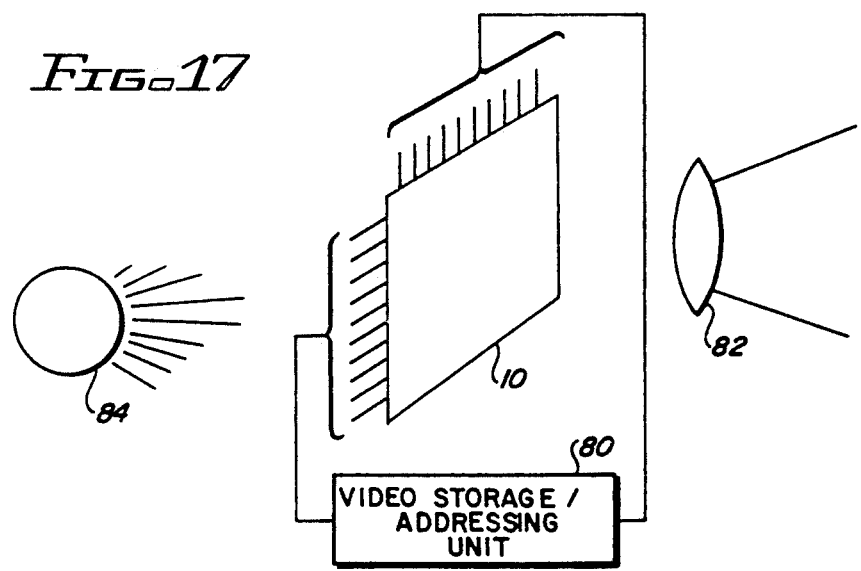
FIG. 17 is a schematic diagram of a high brightness projector employing the solid state electro-optic light valve according to the present invention.

The light valve of the present invention also finds utility in new devices. For example, FIG. 17 illustrates a high brightness projector employing the light valve 10. The high brightness projector may be constructed by providing a full array of 1000×2000 pixel format on the light valve 10, which is equivalent to a 35 mm to 60 mm photographic format. The video information to be projected, such as a motion picture, is supplied by a video storage/addressing unit 80. The unit 80 controls the pixels on the light valve 10 and the image is projected through a lens 82, illumination being supplied by a light source 84. Consequently, rather than using film, a motion picture may be projected by obtaining a digital representation of the video frames and controlling the state of pixels in a light valve (or plurality light valves for color projection) to project the images. As a result, conventional projection optics may be used.

The foregoing description is intended by way of example only and is not intended to limit the present invention in any way except as set forth in the following claims.

We claim:
1. A light valve for use in a spatial light modulator comprising:
   a. a layer of solid state electro-optic material;
   b. a two-dimensional pixelized electrode array including
      i. a plurality of first electrodes disposed on said layer of electro-optic material wherein the plurality of first electrodes is arranged in a comb configuration deposited on said layer of solid state electro-optic material and comprises first electrode conductive segments spaced from and parallel to each other along a plurality of linear paths;
      ii. a plurality of second electrodes disposed on said electro-optic material wherein the plurality of second electrodes comprises second electrode conductive segments deposited on said electro-optic material between and spaced from adjacent conductive segments of said first electrodes;

c. spacing between each first electrode and an adjacent second electrode, the spacing defining a pixel through which light is controlled to pass;

d. means for addressing pixels of said light valve to control the passage of light through selected pixels of said solid state electro-optic layer, including i. a photoconductive switch positioned between each of said first electrode conductive segments and said second electrode conductive segment of each pixel; and ii. a voltage supply connected to said first and second electrode conductive segments and to said photoconductive switch, said photoconductive switch being responsive to activation illumination projected from a side of said solid state electro-optic layer opposite that which image illumination is projected, whereby each pixel is controlled to allow light to pass therethrough when said photoconductive switch closes in response to said activation illumination.

2. A light valve for use in a spatial light modulator comprising:

a. a layer of solid state electro-optic material;

b. a two-dimensional pixelized electrode array including i. a plurality of first electrodes disposed on said layer of electro-optic material wherein the plurality of first electrodes comprises parallel rows of conductive strips disposed on said electro-optic layer, a plurality of holes being provided at spaced intervals in said conductive strips;

ii. a plurality of second electrodes disposed on said electro-optic material wherein the plurality of second electrodes comprise conductive segments disposed at the center of each hole in said conductive strips but not occupying the entirety of said holes, insulative material being disposed in said conductive holes about said conductive segments, the conductive segments of said plurality of second electrodes being electrically connected in columns perpendicular with respect to said rows of conductive strips forming said first electrodes; and c. spacing between each first electrode and an adjacent second electrode, the spacing defining a pixel through which light is controlled to pass.

3. A light valve for use in a spatial light modulator comprising:

a. a layer of solid state electro-optic material;

b. a two-dimensional pixelized electrode array including i. a plurality of first electrodes disposed on said layer of electro-optic material wherein the plurality of first electrodes is arranged in a comb configuration deposited on said layer of solid state electro-optic material and comprises first electrode conductive segments spaced from and parallel to each other along a plurality of linear paths;

ii. a plurality of second electrodes disposed on said electro-optic material wherein the plurality of second electrodes comprises second electrode conductive segments deposited on said electro-optic material between and spaced from adjacent conductive segments of said first electrodes, each of said second electrode conductive segments including an upper surface;

c. spacing between each first electrode and an adjacent second electrode, the spacing defining a pixel through which light is controlled to pass;

d. an insulating layer covering an entire surface of said light valve except for the upper surfaces of the second electrode conductive segments; and e. conductive strips disposed atop said insulating layer for contacting the upper surfaces of the second electrode conductive segments and connecting together the second electrode conductive segments in linear arrays.

4. A light valve for use in a spatial light modulator comprising:

a. a layer of solid state electro-optic material;

b. a two-dimensional pixelized electrode array including i. a plurality of first electrodes disposed on said layer of electro-optic material wherein the plurality of first electrodes is arranged in a comb configuration deposited on said layer of solid state electro-optic material and comprises first electrode conductive segments spaced from and parallel to each other along a plurality of linear paths;

ii. a plurality of second electrodes disposed on said electro-optic material wherein the plurality of second electrodes comprises second electrode conductive segments deposited on said electro-optic material between and spaced from adjacent conductive segments of said first electrodes, each of said second electrode conductive segments including an upper surface;

c. spacing between each first electrode and an adjacent second electrode, the spacing defining a pixel through which light is controlled to pass;

d. an insulating layer covering an entire surface of said light valve except for the upper surfaces of the second electrode conductive segments; and e. a layer of electrically conductive, optically transparent material covering said insulating layer and contacting the upper surfaces of the second electrode conductive segments but not the first electrode conductive segments for electrically connecting the second electrode conductive segment in common.

* * * * *